(12) United States Patent
Park

(10) Patent No.: US 9,785,584 B2
(45) Date of Patent: Oct. 10, 2017

(54) DATA STORAGE DEVICE AND METHOD THEREOF

(71) Applicant: SK hynix Inc., Gyeonggi-do (KR)

(72) Inventor: Jeen Park, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/146,570

(22) Filed: May 4, 2016

(65) Prior Publication Data

US 2017/0235687 A1    Aug. 17, 2017

(30) Foreign Application Priority Data

Feb. 11, 2016  (KR) .......................... 10-2016-0015740

(51) Int. Cl.
*G06F 13/28* (2006.01)
*G06F 13/16* (2006.01)
*G06F 3/06* (2006.01)

(52) U.S. Cl.
CPC ........ *G06F 13/1673* (2013.01); *G06F 3/0659* (2013.01); *G06F 13/28* (2013.01); *G06F 13/161* (2013.01)

(58) Field of Classification Search
CPC ...... G06F 13/12; G06F 13/385; G06F 3/0659; G06F 13/28; G06F 13/1673; G06F 13/161
See application file for complete search history.

(56) References Cited

U.S. PATENT DOCUMENTS

| 8,341,311 B1 * | 12/2012 | Szewerenko | ....... G06F 13/1673 |
| | | | 710/22 |
| 2008/0162753 A1 * | 7/2008 | Liu | ....... G06F 13/385 |
| | | | 710/74 |

FOREIGN PATENT DOCUMENTS

KR    1020150055882    5/2015

* cited by examiner

*Primary Examiner* — Ernest Unelus
(74) *Attorney, Agent, or Firm* — IP & T Group LLP

(57) ABSTRACT

A data storage device includes a nonvolatile memory device; a buffer memory for storing temporarily data to be transmitted from the nonvolatile memory device to a host device or data to be transmitted from the host device to the nonvolatile memory device; a memory control unit for performing a control operation for controlling the nonvolatile memory device; and a direct memory access (DMA) unit for performing a data transmission operation associated with the buffer memory, according to control of the memory control unit, wherein the DMA block transmits a first data from the nonvolatile memory device to the buffer memory, and wherein the DMA unit transmits a second data from the nonvolatile memory device to the buffer memory, while the first data stored in the buffer memory is transmitted from the buffer memory to the host device.

18 Claims, 9 Drawing Sheets

DATA STORAGE DEVICE AND METHOD THEREOF

CROSS-REFERENCES TO RELATED APPLICATION

The present application claims priority under 35 U.S.C. §119(a) to Korean application number 10-2016-0015740, filed on Feb. 11, 2016, in the Korean Intellectual Property Office, which is incorporated herein by reference in its entirety.

BACKGROUND

1. Technical Field

Various embodiments of the present disclosure relate to a data storage device which uses a nonvolatile memory device as a storage medium.

2. Related Art

Recently, the paradigm for the computer environment has been converted into ubiquitous computing so that computer systems can be used anytime and anywhere. Due to this, use of portable electronic devices such as mobile phones, digital cameras, and notebook computers has rapidly increased. In general, such portable electronic devices use a data storage device which uses a memory device. A data storage device stores data to be used in a portable electronic device.

A data storage device using a memory device does not include any mechanical driving part. Hence, it provides generally excellent stability and durability, high information access speed and low power consumption. Data storage devices having such advantages include a universal serial bus (USB) memory device, memory cards having various interfaces, a universal flash storage (UFS) device, and a solid state drive (SSD).

SUMMARY

Various embodiments of the present disclosure are directed to a data storage device which reads out data to be transmitted next, from a nonvolatile memory device, while transmitting previously read-out data to a host device.

In an embodiment, a data storage device may include: a nonvolatile memory device; a buffer memory for storing temporarily data to be transmitted from the nonvolatile memory device to a host device or data to be transmitted from the host device to the nonvolatile memory device; a memory control unit for performing a control operation for controlling the nonvolatile memory device; and a direct memory access (DMA) unit for performing a data transmission operation associated with the buffer memory, according to control of the memory control unit, wherein the DMA block transmits a first data from the nonvolatile memory device to the buffer memory, and wherein the DMA unit transmits a second data from the nonvolatile memory device to the buffer memory, while the first data stored in the buffer memory is transmitted from the buffer memory to the host device.

In an embodiment, a method for operating a data storage device including a nonvolatile memory device, a buffer memory and a memory control unit may include: transmitting, by a direct memory access (DMA) unit, a first data from the nonvolatile memory device to the buffer memory; storing, by the DMA unit, the first data in the buffer memory; transmitting, by the DMA unit, the first data stored in the buffer memory from the buffer memory to the host device, in parallel with transmitting the second data from the nonvolatile memory device to the buffer memory.

According to the embodiments, data processing speed of a data storage device may be improved.

DETAILED DESCRIPTION

Figure 1:
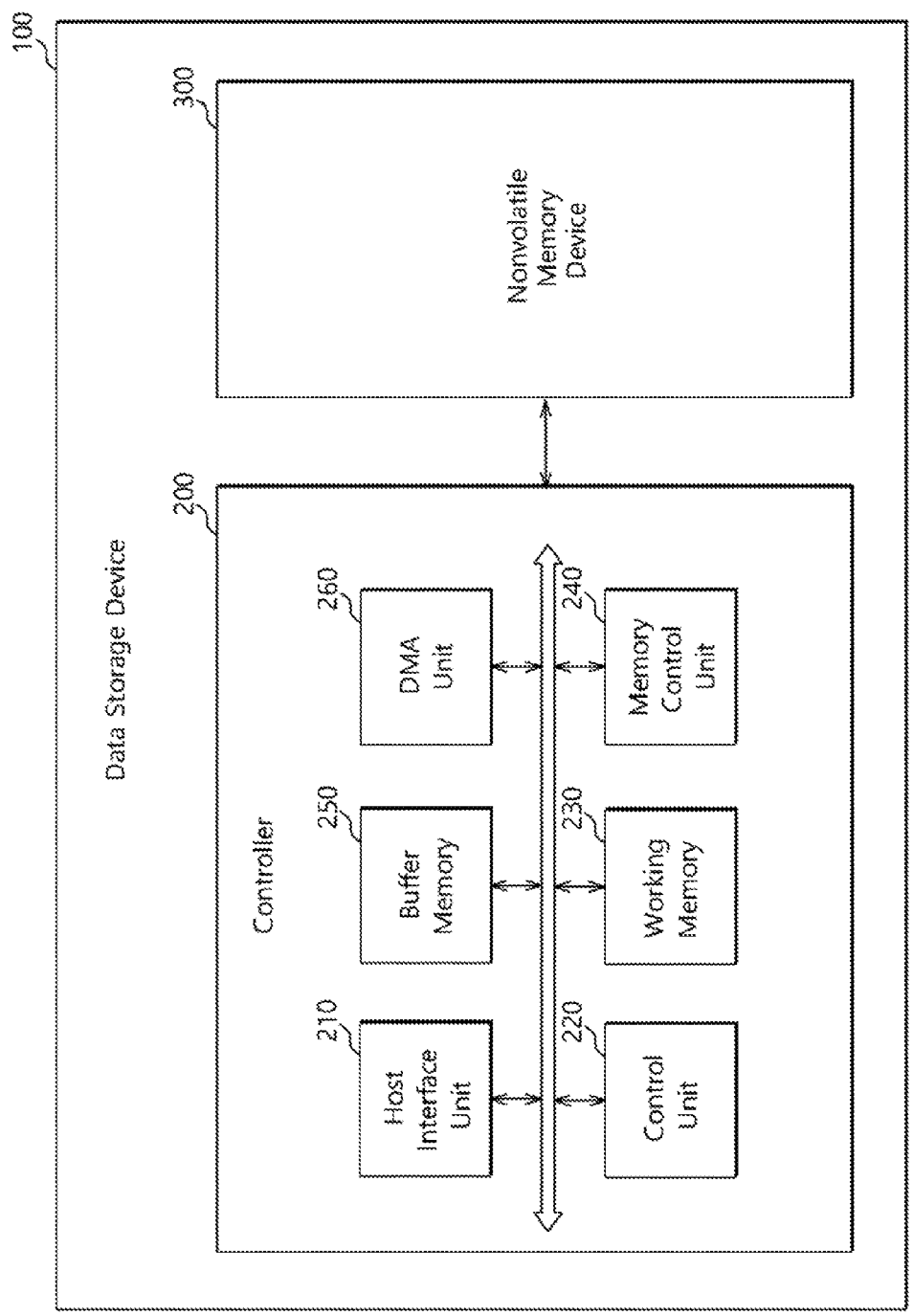
FIG. 1 is a block diagram illustrating a data storage device according to an embodiment of the invention.

In the present invention, advantages, features and methods for achieving them will become more apparent after a reading of the following embodiments described in conjunction with the drawings. The present invention may, however, be embodied in different forms and should not be construed as being limited to the embodiments set forth herein. Rather, these embodiments are provided to describe the present invention in sufficient detail so that a person skilled in the art to which the invention pertains can practice the present invention.

It is to be understood herein that embodiments of the present invention are not limited to the particulars shown in the drawings, that the drawings are not necessarily to scale and in some instances proportions may have been exaggerated in order to more clearly depict certain features of the invention. While particular terminology is used herein, it is to be appreciated that the terminology used herein is for the purpose of describing particular embodiments only and is not intended to limit the scope of the present invention.

As used herein, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

Hereinafter, a data storage device will be described below with reference to the accompanying drawings through various examples of embodiments.

FIG. 1 is a block diagram illustrating a data storage device 100, according to an embodiment of the invention.

Referring to FIG. 1, the data storage device 100 may store data to be accessed by a host device (not shown) such as a mobile phone, an MP3 player, a laptop computer, a desktop computer, a game player, a television (TV), an in-vehicle infotainment system, and the like. The data storage device 100 may also be referred to as a memory system.

The data storage device 100 may be manufactured as any one of various kinds of storage devices according to the protocol of an interface which is electrically coupled with the host device. For example, the data storage device 100 may be configured as any one of various kinds of storage devices such as a solid state drive (SSD), a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a Personal Computer Memory Card International Association (PCMCIA) card type storage device, a peripheral component interconnection (PCI) card type storage device, a PCI express (PCI-E) card type storage device, a compact flash (CF) card, a smart media card, a memory stick, and the like.

The data storage device 100 may be manufactured as any one of various kinds of package types, such as a package-on-package (POP), a system-in-package (SIP), a system-on-chip (SOC), a multi-chip package (MCP), a chip-on-board (COB), a wafer-level fabricated package (WFP), a wafer-level stack package (WSP) and the like.

The data storage device 100 may include a controller 200 and a nonvolatile memory device 300.

The nonvolatile memory device 300 may operate as the storage medium of the data storage device 100. The nonvolatile memory device 300 may be configured as any one of various types of nonvolatile memory devices such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PCRAM) using a chalcogenide alloy, a resistive random access memory (RERAM) using a transition metal oxide, and the like. The ferroelectric random access memory (FRAM), the magnetic random access memory (MRAM), the phase change random access memory (PCRAM) and the resistive random access memory (RERAM) are a kind of a nonvolatile random access memory device capable of random access to memory cells. The nonvolatile memory device 300 may be configured as a combination of a NAND flash memory device and the above-described various types of nonvolatile random access memory devices.

The controller 200 may include a host interface unit 210, a control unit 220, a working memory 230, a memory control unit 240, a buffer memory 250, and a direct memory access (DMA) unit 260.

The host interface unit 210 may interface the host device and the data storage device 100. For example, the host interface unit 210 may communicate with the host device through any one of universal serial bus (USB), universal flash storage (UFS), multimedia card (MMC), parallel advanced technology attachment (PATA), serial advanced technology attachment (SATA), small computer system interface (SCSI), serial attached SCSI (SAS), peripheral component interconnection (PCI), PCI express (PCI-E) protocols and the like The control unit 220 may control the general operations of the controller 200. The control unit 220 may drive an instruction or an algorithm of a code type, that is, a software, loaded on the working memory 230, and may analyze and process a request inputted from the host device. The control unit 220 may control the operations of function blocks inside the controller 200, according to the software.

The working memory 230 may store a software to be driven by the control unit 220. The working memory 230 may store data necessary for driving of the software. The working memory 230 may be configured as a random access memory such as, a dynamic random access memory (DRAM), a static random access memory (SRAM), and the like.

The memory control unit 240 may control the nonvolatile memory device 300 according to control of the control unit 220. The memory control unit 240 may generate control signals (e.g., commands, addresses, clock signals and the like) for controlling the operation of the nonvolatile memory device 300 and provide the generated control signals to the nonvolatile memory device 300. The memory control unit 240 may also be referred to as a memory interface unit.

The buffer memory 250 may temporarily store data to be transmitted from the host device to the nonvolatile memory device 300 or from the nonvolatile memory device 300 to the host device. The buffer memory 250 may be configured as a random access memory such as, a dynamic random access memory (DRAM) or a static random access memory (SRAM).

The DMA unit 260 may perform a data transmission operation associated with the buffer memory 250, according to control of the memory control unit 240. The DMA unit 260 may transmit data read out from the nonvolatile memory device 300 to the buffer memory 250. The DMA unit 260 may transmit the data stored in the buffer memory 250, to the host device. The DMA unit 260 may transmit data transmitted from the host device, to the buffer memory 250. The DMA unit 260 may transmit the data stored in the buffer memory 250, to the nonvolatile memory device 300.

Figure 2:
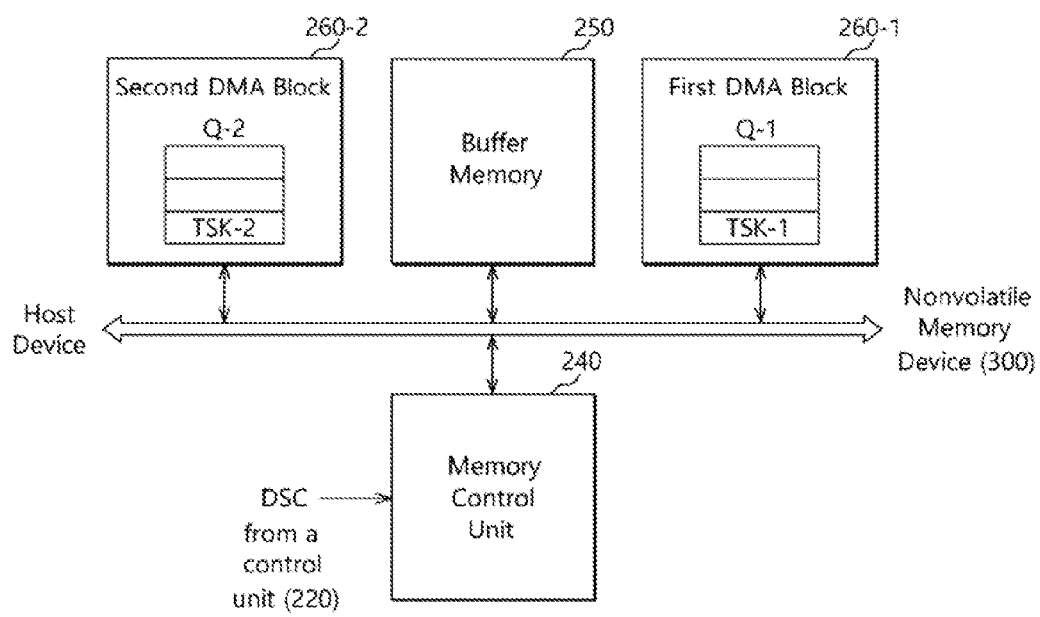
FIG. 2 is a block diagram of the memory control unit, the buffer memory and the DMA unit shown in FIG. 1.

FIG. 2 is a block diagram of the memory control unit 240, the buffer memory 250, and the DMA unit 260 shown in FIG. 1. The DMA unit 260 may include a first and a second DMA blocks 260-1 and 260-2.

Referring to FIG. 2, the memory control unit 240 may operate according to a descriptor DSC provided from the control unit 220. The descriptor DSC may mean a work order in which works to be processed by the memory control unit 240 to control the nonvolatile memory device 300 are written. The memory control unit 240 may control operations (e.g., a read operation, a write operation, an erase operation, and the like) of the nonvolatile memory device 300, according to the descriptor DSC.

In the case where a data transmission operation associated with the buffer memory 250 is needed, the memory control unit 240 may generate information necessary for the data transmission operation, as a task TSK, and provide the generated task TSK to the first or second DMA blocks 260-1, 260-2 for which the data transmission operation is to be performed.

The first DMA block 260-1 may process a task TSK-1 stored in a queue Q-1. The first DMA block 260-1 may perform a data transmission operation between the nonvolatile memory device 300 and the buffer memory 250 according to the task TSK-1. The second DMA block 260-2 may process a task TSK-2 stored in a queue Q-2. The second DMA block 260-2 may perform a data transmission operation between the host device and the buffer memory 250 according to the task TSK-2.

Figure 3:
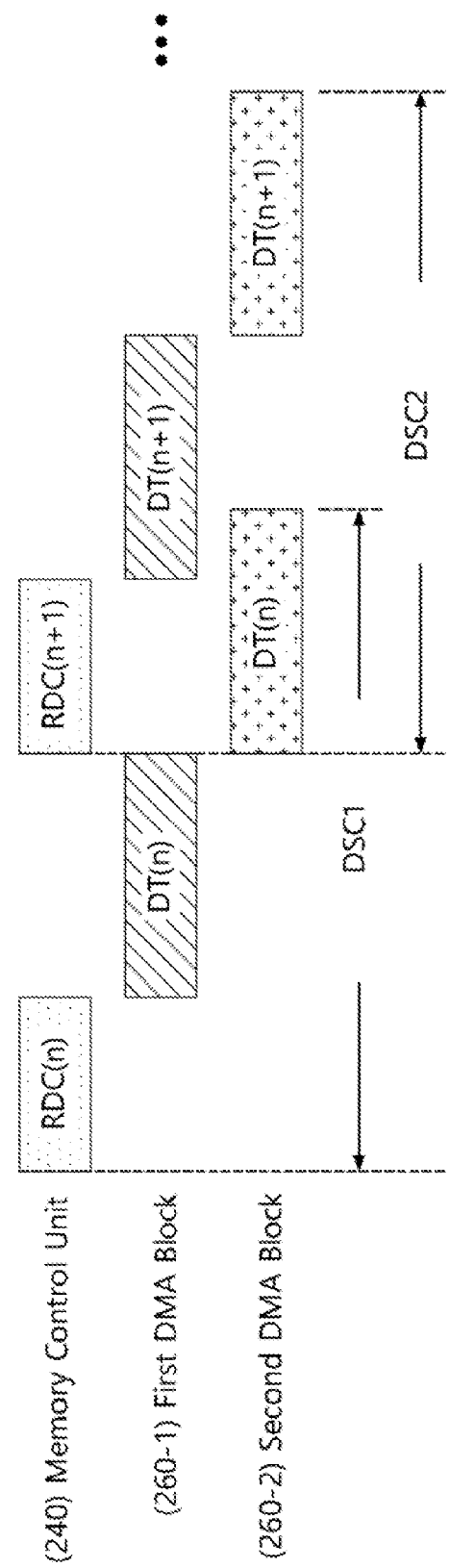
FIG. 3 is a timing diagram illustrating the operation of a controller for reading out successive data from a nonvolatile memory device, according to an embodiment of the invention.
Figure 4:
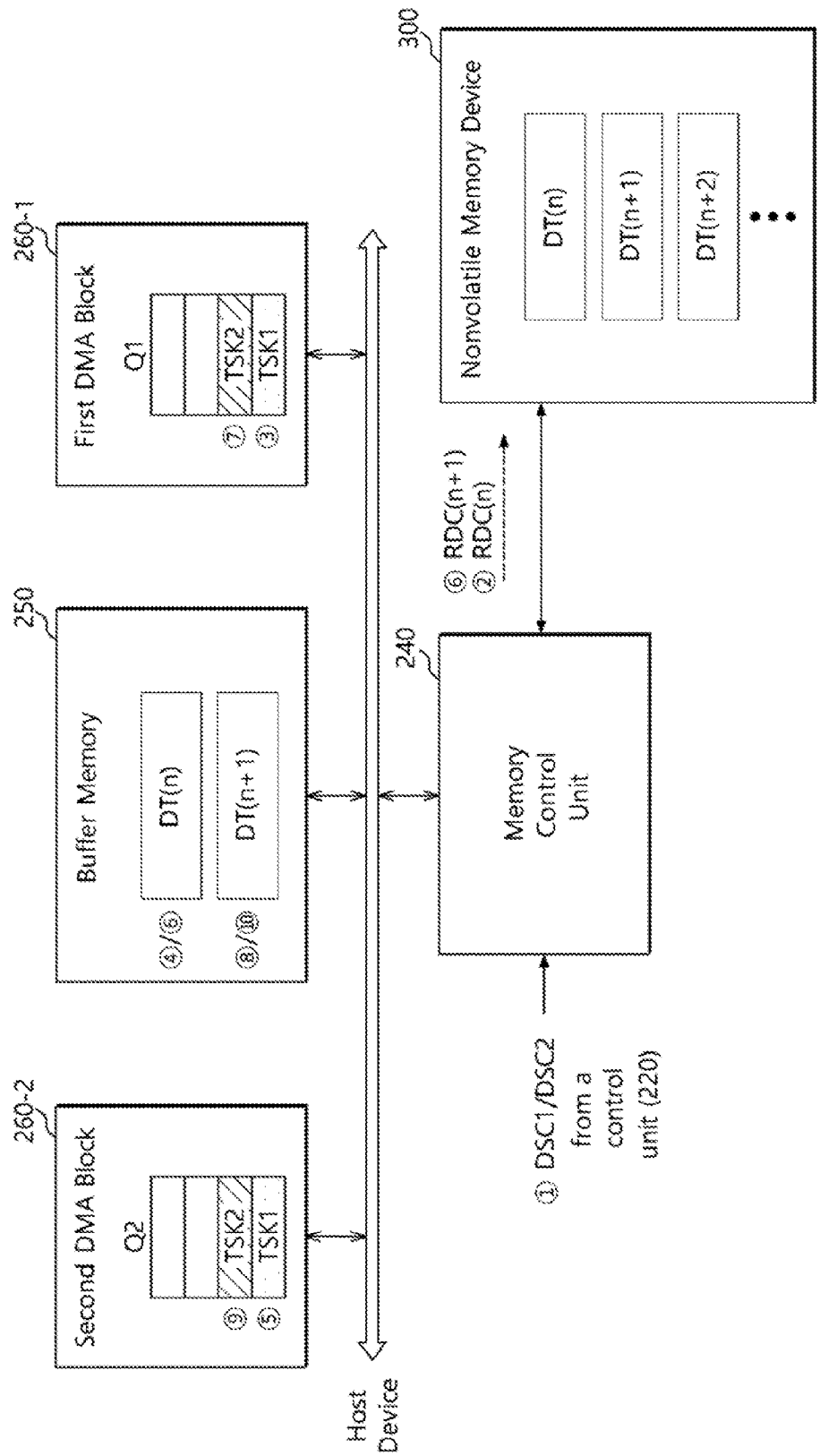
FIG. 4 is a diagram illustrating operations of internal blocks of the controller which operates according to the timing diagram of FIG. 3.

FIG. 3 is a timing diagram illustrating an operation of the controller 200 for reading out successive data from the nonvolatile memory device 300. FIG. 4 is a diagram illustrating operations of internal blocks of the controller 200 which operates according to the timing diagram of FIG. 3.

In FIGS. 3 and 4, a read control operation RDC may be defined as an operation of providing a command, an address and a control signal for controlling a read operation, to the nonvolatile memory device 300, to read out data stored in a specified memory cell (or specified memory cells) of the nonvolatile memory device 300. The nonvolatile memory device 300 controlled according to the read control operation RDC may be defined as being in a state in which sensing of the data stored in the memory cell (or the memory cells) is completed and sensed data is capable of being outputted to an external.

The memory control unit 240 may be provided with a first and a second descriptors DSC1 and DSC2 from the control unit 220 (step ①). The memory control unit 240 may perform an operation of reading out and transmitting first and second data DT(n) and DT(n+1) according to the first and second descriptors DSC1 and DSCC2, respectively.

The memory control unit 240, which has determined based on the first and second descriptors DSC1 and DSC2 that reading-out of successive data should be performed, may perform a first read control operation RDC(n) for reading out the first data DT(n) (step ②).

After the first read control operation RDC(n) is completed, the memory control unit 240 may provide a first task TSK1 to the first DMA block 260-1 (step ③). The first task TSK1 may include information necessary for a data transmission operation for the first data DT(n).

The first DMA block 260-1 may perform a transmission operation from the nonvolatile memory device 300 to the buffer memory 250 for the first data DT(n) for which sensing is completed, according to the first task TSK1 (step ④).

When the first data DT(n) is completely stored in the buffer memory 250, the first DMA block 260-1 may transfer the first task TSK1 to the second DMA block 260-2 (step ⑤).

The second DMA block 260-2 may perform a transmission operation from the buffer memory 250 to the host device for the first data DT(n) stored in the buffer memory 250, according to the first task TSK1 (step ⑥). While the first task TSK1 is processed by the second DMA block 260-2, the memory control unit 240 may perform a second read control operation RDC(n+1) for reading out the second data DT(n+1) successive to the first data DT(n) (step ⑥).

After the second read control operation RDC(n+1) is completed, the memory control unit 240 may provide a second task TSK2 to the first DMA block 260-1 (step ⑦). The second task TSK2 may include information necessary for a data transmission operation for the second data DT(n+1).

The first DMA block 260-1 may perform a transmission operation from the nonvolatile memory device 300 to the buffer memory 250 for the second data DT(n+1) for which sensing is completed, according to the second task TSK2 (step ⑧).

While a portion of previously read-out data (i.e., the first data DT(n)) is transmitted to the host device by the second DMA block 260-2, a read control operation for reading out data to be transmitted next (i.e., the second data DT(n+1)) may be performed. Also, while a portion of previously read-out data (i.e., the first data DT(n)) is transmitted to the host device by the second DMA block 260-2, a portion of data to be transmitted next (i.e., the second data DT(n+1)) may be stored in the buffer memory 250 by the first DMA block 260-1. Because the first DMA block 260-1 may perform the data transmission operation between the nonvolatile memory device 300 and the buffer memory 250 in a parallel operation with the second DMA block 260-2 performing the data transmission operation between the buffer memory 250 and the host device, successive data may be processed more quickly.

When storing of the second data DT(n+1) in the buffer memory 250 is completed, the first DMA block 260-1 may transfer the second task TSK2 to the second DMA block 260-2 (step ⑨).

The second DMA block 260-2 may perform a transmission operation from the buffer memory 250 to the host device for the second data DT(n+1) stored in the buffer memory 250, according to the second task TSK2 (step ⑩).

Figure 5:
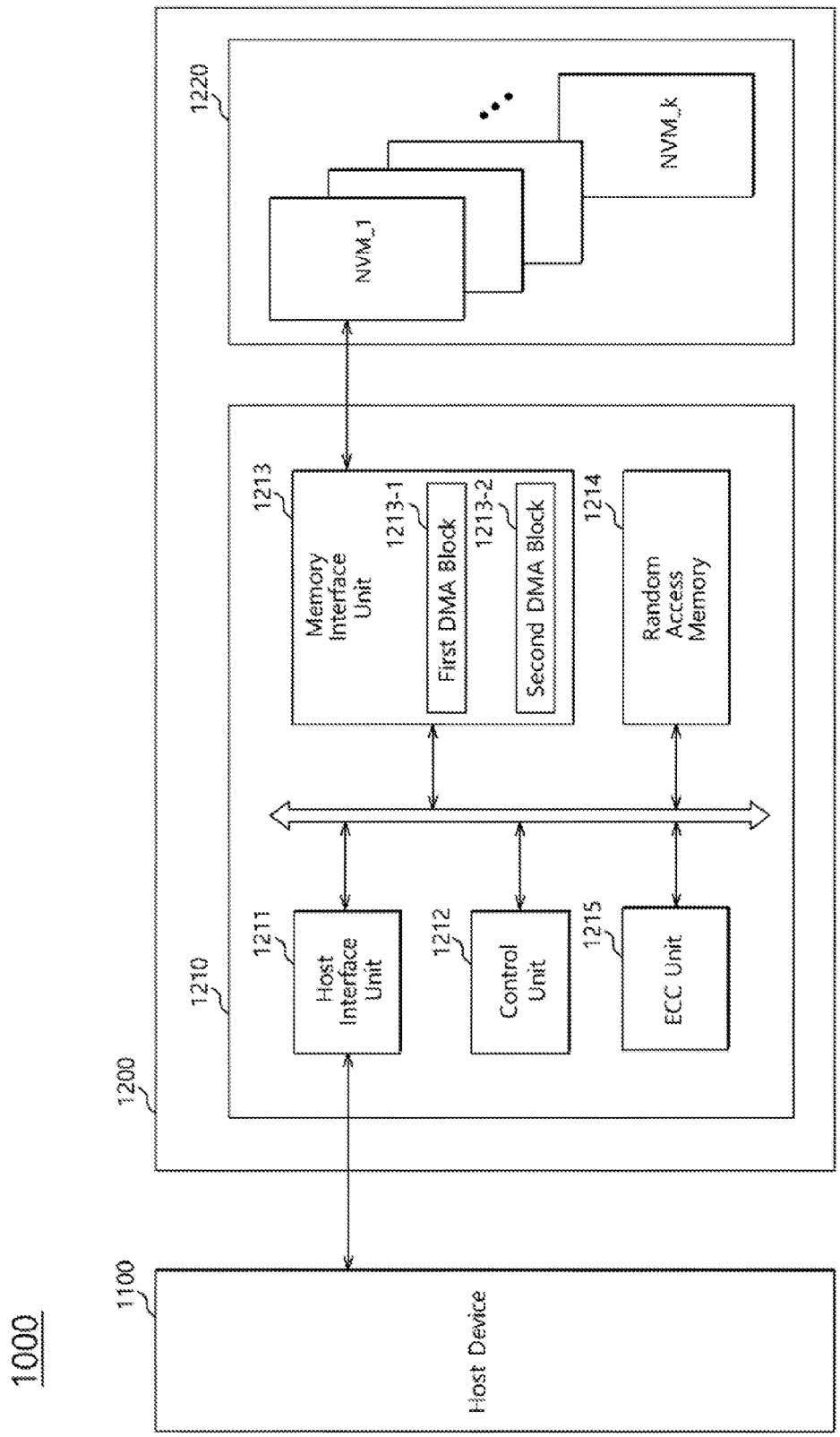
FIG. 5 is a block diagram illustrating a data processing system including a data storage device, according to an embodiment of the invention.

FIG. 5 is a block diagram illustrating a data processing system 1000 including a data storage device 1200, according to an embodiment of the invention.

Referring to FIG. 5, the data processing system 1000 may include a host device 1100 and the data storage device 1200.

The data storage device 1200 may include a controller 1210 and a nonvolatile memory device 1220. The data storage device 1200 may be used by being coupled to the host device 1100. The host device 1100 may be, for example, a mobile phone, an MP3 player, a laptop computer, a desktop computer, a game player, a television (TV), an in-vehicle infotainment system, and the like. The data storage device 1200 is also referred to as a memory system.

The controller 1210 may include a host interface unit 1211, a control unit 1212, a memory interface unit 1213, a random access memory 1214, and an error correction code (ECC) unit 1215.

The control unit 1212 may control the general operations of the controller 1210 in response to a request from the host device 1100. The control unit 1212 may drive a firmware or a software for controlling the nonvolatile memory device 1220.

The random access memory 1214 may be used as the working memory of the control unit 1212. The random access memory 1214 may be used as a buffer memory which temporarily stores data read out from the nonvolatile memory device 1220 or data provided from the host device 1100.

The host interface unit 1211 may interface the host device 1100 and the controller 1210. For example, the host interface unit 1211 may communicate with the host device 1100 through one of various interface protocols such as, a universal serial bus (USB) protocol, a universal flash storage (UFS) protocol, a multimedia card (MMC) protocol, a peripheral component interconnection (PCI) protocol, a PCI express (PCI-E) protocol, a parallel advanced technology attachment (PATA) protocol, a serial advanced technology attachment (SATA) protocol, a small computer system interface (SCSI) protocol, a serial attached SCSI (SAS) protocol and the like.

The memory interface unit 1213 may interface the controller 1210 and the nonvolatile memory device 1220. The memory interface unit 1213 may provide commands and addresses to the nonvolatile memory device 1220. Furthermore, the memory interface unit 1213 may exchange data with the nonvolatile memory device 1220.

The memory interface unit 1213 may include a first DMA block 1213-1 and a second DMA block 1213-2. The first DMA block 1213-1 and the second DMA block 1213-2 may operate in parallel to read out data to be transmitted next, while previously read-out data is transmitted to the host device 1100, as described above with reference to FIGS. 3 and 4.

The error correction code (ECC) unit 1215 may encode data to be stored in the nonvolatile memory device 1220 using a predetermined error correction code. Also, the ECC unit 1215 may decode data read out from the nonvolatile memory device 1220 using a predetermined error correction code.

The nonvolatile memory device 1220 may be used as the storage medium of the data storage device 1200. The nonvolatile memory device 1220 may include a plurality of nonvolatile memory chips (or dies) NVM_1 to NVM_k.

The controller 1210 and the nonvolatile memory device 1220 may be manufactured as any one of various data storage devices. For example, the controller 1210 and the nonvolatile memory device 1220 may be integrated into one semiconductor device and may be manufactured as any one of a multimedia card in the form of an MMC, an eMMC, an RS-MMC and a micro-MMC, a secure digital card in the form of an SD, a mini-SD and an micro-SD, a universal serial bus (USB) storage device, a universal flash storage (UFS) device, a Personal Computer Memory Card International Association (PCMCIA) card, a compact flash (CF) card, a smart media card, a memory stick, and the like.

Figure 6:
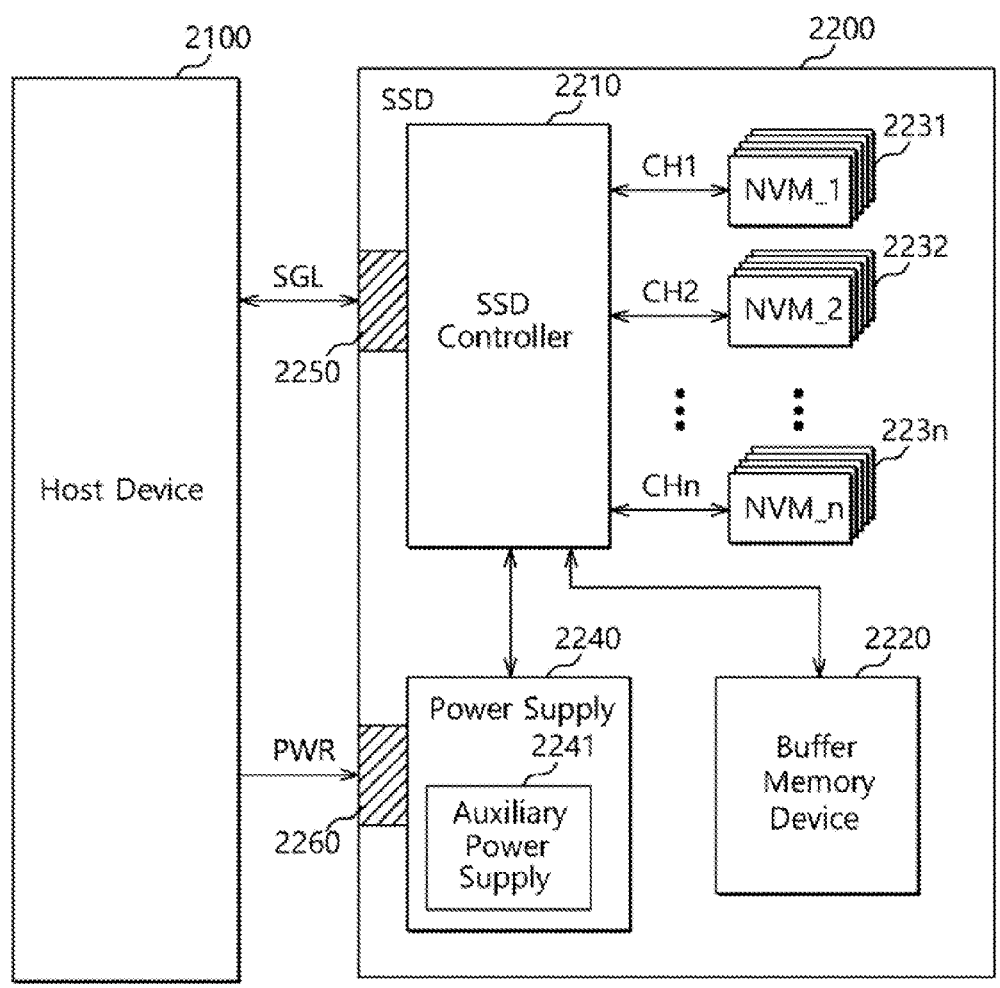
FIG. 6 is a block diagram illustrating a data processing system including a solid state drive (SSD), according to an embodiment of the invention.

FIG. 6 is a block diagram illustrating a data processing system 2000 including a solid state drive (SSD) 2200 according to an embodiment of the invention.

Referring to FIG. 6, the data processing system 2000 may include a host device 2100 and the SSD 2200.

The SSD 2200 may include an SSD controller 2210, a buffer memory device 2220, nonvolatile memory devices 2231 to 223n, a power supply 2240, a signal connector 2250, and a power connector 2260.

The SSD controller 2210 may access the nonvolatile memory devices 2231 to 223n in response to a request from the host device 2100.

The buffer memory device 2220 may temporarily store data which are to be stored in the nonvolatile memory devices 2231 to 223n. Further, the buffer memory device 2220 may temporarily store data which are read out from the nonvolatile memory devices 2231 to 223n. The data temporarily stored in the buffer memory device 2220 may be transmitted to the host device 2100 or the nonvolatile memory devices 2231 to 223n under control of the SSD controller 2210.

The nonvolatile memory devices 2231 to 223n may be used as storage media of the SSD 2200. The nonvolatile memory devices 2231 to 223n may be coupled with the SSD controller 2210 through a plurality of channels CH1 to CHn, respectively. One or more nonvolatile memory devices may be coupled to one channel. The nonvolatile memory devices coupled to one channel may be coupled to the same signal bus and data bus.

The power supply 2240 may provide power PWR inputted through the power connector 2260, to the inside of the SSD 2200. The power supply 2240 may include an auxiliary power supply 2241. The auxiliary power supply 2241 may supply power so as to allow the SSD 2200 to be normally terminated when a sudden power-off occurs. The auxiliary power supply 2241 may include large capacitance capacitors capable of charging power PWR.

The SSD controller 2210 may exchange a signal SGL with the host device 2100 through the signal connector 2250. The signal SGL may include a command, an address, data, and the like. The signal connector 2250 may be configured as a connector such as, one of parallel advanced technology attachment (PATA), serial advanced technology attachment (SATA), small computer system interface (SCSI), serial attached SCSI (SAS), peripheral component interconnection (PCI), PCI express (PCI-E), universal flash storage (UFS) protocols, and the like, according to an interface scheme between the host device 2100 and the SSD 2200.

Figure 7:
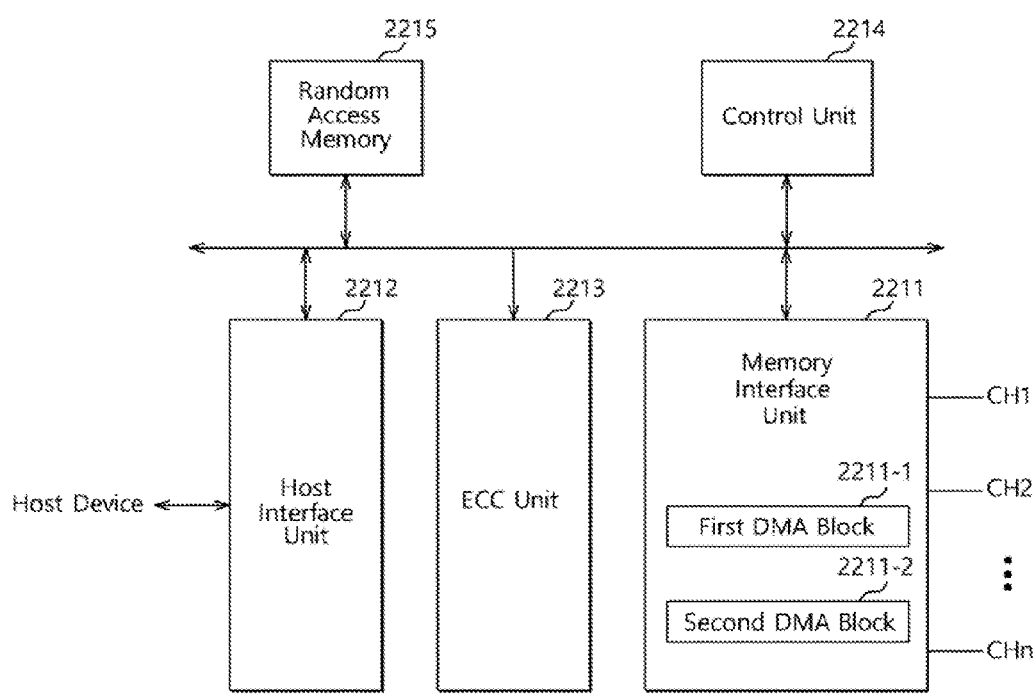
FIG. 7 is a block diagram illustrating the SSD controller shown in FIG. 6.

FIG. 7 is a block diagram illustrating the SSD controller 2210 shown in FIG. 6.

Referring to FIG. 7, the SSD controller 2210 may include a memory interface unit 2211, a host interface unit 2212, an error correction code (ECC) unit 2213, a control unit 2214, and a random access memory 2215.

The memory interface unit 2211 may provide control signals such as, commands and addresses to the nonvolatile memory devices 2231 to 223n. Moreover, the memory interface unit 2211 may exchange data with the nonvolatile memory devices 2231 to 223n. The memory interface unit 2211 may scatter data transmitted from the buffer memory device 2220 to the respective channels CH1 to CHn, under control of the control unit 2214. Furthermore, the memory interface unit 2211 may transmit data read out from the nonvolatile memory devices 2231 to 223n to the buffer memory device 2220, under control of the control unit 2214.

The memory interface unit 2211 may include first and second DMA blocks 2211-1 and 2211-2. The first and second DMA blocks 2211-1 and 2211-2 may operate in parallel to read out data to be transmitted next, while previously read-out data is transmitted to the host device 2100, as described above with reference to FIGS. 3 and 4.

The host interface unit 2212 may provide an interface with the host device 2100. For example, the host interface unit 2212 may communicate with the host device 2100 through one of parallel advanced technology attachment (PATA), serial advanced technology attachment (SATA), small computer system interface (SCSI), serial attached SCSI (SAS), peripheral component interconnection (PCI), PCI express (PCI-E), universal flash storage (UFS) protocols, and the like. In addition, the host interface unit 2212 may perform a disk emulating function of supporting the host device 2100 to recognize the SSD 2200 as a hard disk drive (HDD).

The control unit 2214 may analyze and process the signal SGL inputted from the host device 2100. The control unit 2214 may control operations of the buffer memory device 2220 and the nonvolatile memory devices 2231 to 223n according to a firmware or a software for driving the SSD 2200. The random access memory 2215 may be used as a working memory for driving the firmware or the software.

The ECC unit 2213 may generate parity data to be transmitted to the nonvolatile memory devices 2231 to 223n, among data stored in the buffer memory device 2220. The generated parity data may be stored, along with data, in the nonvolatile memory devices 2231 to 223n. The ECC unit 2213 may detect an error of the data read out from the nonvolatile memory devices 2231 to 223n. When the detected error is within a correctable range, the ECC unit 2213 may correct the detected error.

Figure 8:
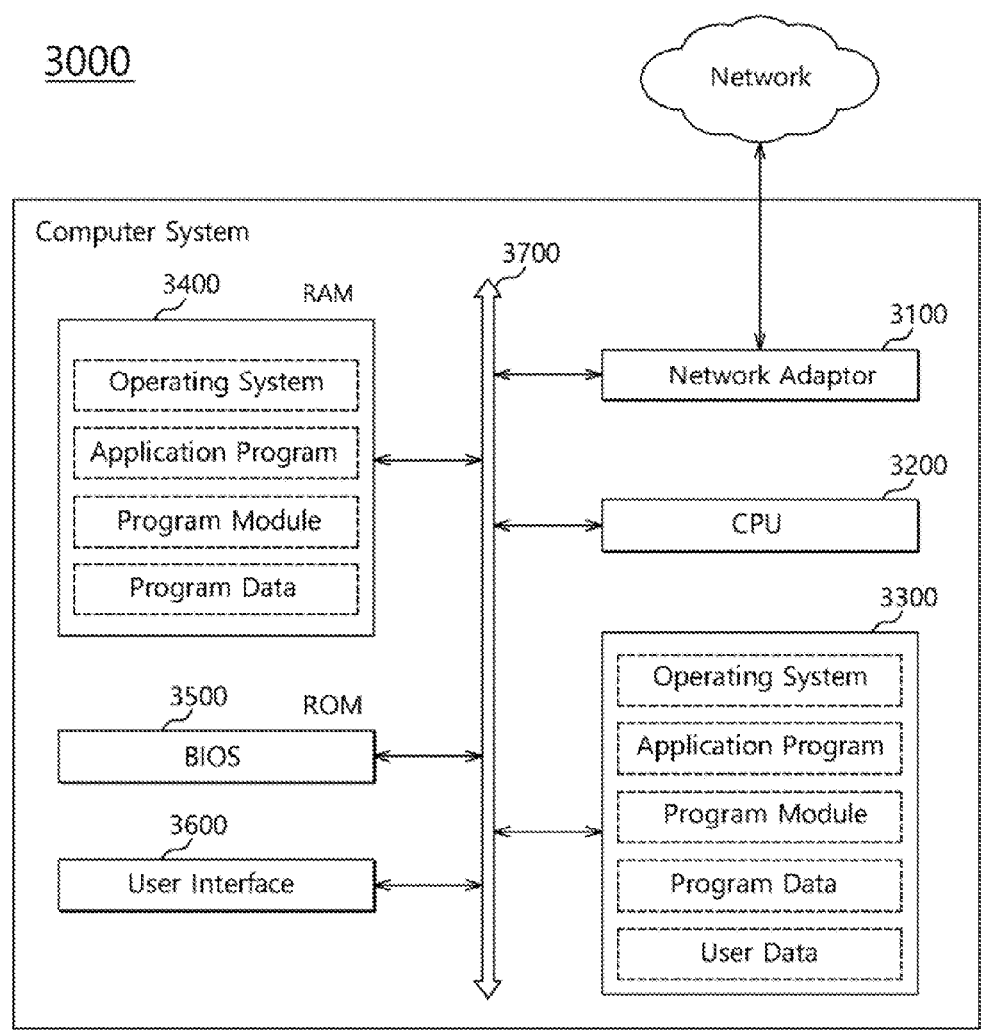
FIG. 8 is a block diagram illustrating a computer system including a data storage device, according to an embodiment of the invention.

FIG. 8 is a block diagram illustrating a computer system 3000 to which a data storage device 3300 is mounted, according to an embodiment of the invention.

Referring to FIG. 8, the computer system 3000 may include a network adaptor 3100, a central processing unit (CPU) 3200, the data storage device 3300, a random access memory (RAM) 3400, a read only memory (ROM) 3500, and a user interface 3600, all of which may be coupled electrically to a system bus 3700. The data storage device 3300 may be configured as the data storage device 100 shown in FIG. 1, the data storage device 1200 shown in FIG. 5, or the SSD 2200 shown in FIG. 6.

The network adaptor 3100 may provide interfacing between the computer system 3000 and external networks. The central processing unit 3200 may perform general operation processing for driving an operating system residing at the RAM 3400 or an application program.

The data storage device 3300 may store general data needed in the computer system 3000. For example, an operating system for driving the computer system 3000, an application program, various program modules, program data and user data may be stored in the data storage device 3300.

The RAM 3400 may be used as the working memory of the computer system 3000. Upon booting, the operating system, the application program, the various program modules and the program data needed for driving programs, which are read out from the data storage device 3300, may be loaded on the RAM 3400. A basic input/output system (BIOS) which is activated before the operating system is driven may be stored in the ROM 3500. Information exchange between the computer system 3000 and a user may be implemented through the user interface 3600.

Figure 9:
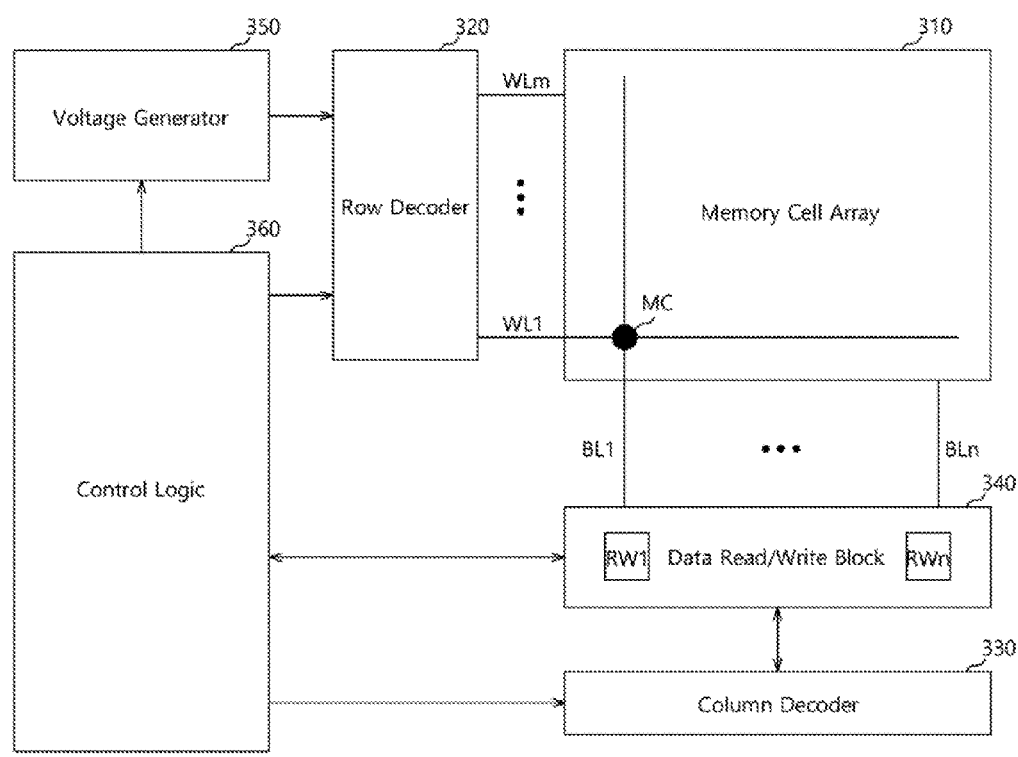
FIG. 9 is a block diagram illustrating a nonvolatile memory device included in a data storage device, according to an embodiment of the invention.

FIG. 9 is a block diagram illustrating a configuration of the nonvolatile memory device 300 included in the data storage device 100 of FIG. 1, according to an embodiment.

Referring to FIG. 9, the nonvolatile memory device 300 may include a memory cell array 310, a row decoder 320, a column decoder 330, a data read/write block 340, a voltage generator 350 and a control logic 360.

The memory cell array 310 may include memory cells MC which are arranged at areas where word lines WL1 to WLm and bit lines BL1 to BLn intersect with each other. The memory cells may be grouped in an access unit, such as, a memory block as an erase unit and a page as a program and read unit.

The row decoder 320 may be coupled with the memory cell array 310 through the word lines WL1 to WLm. The row decoder 320 may operate according to control of the control logic 360. The row decoder 320 may decode addresses provided from an external device (not shown). The row decoder 320 may select and drive the word lines WL1 to WLm, based on the decoding results. For instance, the row decoder 320 may provide a word line voltage provided from the voltage generator 350, to the word lines WL1 to WLm.

The data read/write block 340 may be coupled with the memory cell array 310 through the bit lines BL1 to BLn. The data read/write block 340 may include read/write circuits RW1 to RWn respectively corresponding to the bit lines BL1 to BLn. The data read/write block 340 may operate according to control of the control logic 360. The data read/write block 340 may operate as a write driver or a sense amplifier according to an operation mode. For example, the data read/write block 340 may operate as a write driver which stores data provided from the external device, in the memory cell array 310 in a write operation. For another example, the data read/write block 340 may operate as a sense amplifier which reads out data from the memory cell array 310 in a read operation.

The column decoder 330 may operate according to control of the control logic 360. The column decoder 330 may decode addresses provided from the external device. The column decoder 330 may couple the read/write circuits RW1 to RWn of the data read/write block 340 respectively corresponding to the bit lines BL1 to BLn with data input/output lines (or data input/output buffers), based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control the general operations of the nonvolatile memory device 300, based on control signals provided from the external device. For example, the control logic 360 may control operations of the nonvolatile memory device 300 such as, read, write and erase operations of the nonvolatile memory device 300.

While various embodiments have been described above, it will be understood to those skilled in the art that the embodiments described are examples only. Accordingly, the data storage device described herein should not be limited based on the described embodiments. Many other embodiments and variations thereof will be envisaged by the skilled person in the relevant art without departing from the spirit and or scope of the present invention as defined in the following claims.

What is claimed is:

1. A data storage device comprising:
a nonvolatile memory device;
a buffer memory suitable for storing temporarily data to be transmitted from the nonvolatile memory device to a host device or data to be transmitted from the host device to the nonvolatile memory device;
a memory control unit suitable for controlling the nonvolatile memory device;
a first direct memory access (DMA) block suitable for transmitting a first data and a second data from the nonvolatile memory device to the buffer memory; and
a second DMA block suitable for transmitting a portion of the first data from the buffer memory to the host device while the first DMA block transmits the second data, wherein the memory control unit completes a read control operation for reading out the second data while the first data stored in the buffer memory is transmitted from the buffer memory to the host device.

2. The data storage device according to claim 1, wherein the memory control unit provides a first task including information necessary for transmitting the first data, to the first DMA block, after a read control operation for reading out the first data is completed.

3. The data storage device according to claim 2, wherein the first DMA block transmits the first data read out from the nonvolatile memory device, to the buffer memory, according to the first task.

4. The data storage device according to claim 3, wherein the first DMA block transfers the first task to the second DMA block after transmitting the first data from the nonvolatile memory device to the buffer memory.

5. The data storage device according to claim 4, wherein the second DMA block transmits the first data stored in the buffer memory to the host device according to the first task.

6. The data storage device according to claim 1, wherein the memory control unit provides a second task including information necessary for transmitting the second data, to the first DMA block.

7. The data storage device according to claim 6, wherein the first DMA block transmits the second data read out from the nonvolatile memory device, to the buffer memory, according to the second task.

8. The data storage device according to claim 7, wherein the first DMA block transfers the second task to the second DMA block after transmitting the second data from the nonvolatile memory device to the buffer memory.

9. The data storage device according to claim 8, wherein the second DMA block transmits the second data from the buffer memory to the host device according to the second task.

10. A method for operating a data storage device including a nonvolatile memory device, a buffer memory for storing temporarily data to be transmitted from the nonvolatile memory device to a host device or data to be transmitted from the host device to the nonvolatile memory device, and a memory control unit for performing a control operation for controlling the nonvolatile memory device, comprising:
    transmitting, by a first direct memory access (DMA) unit, a first data and a second data from the nonvolatile memory device to the buffer memory;
    transmitting, by a second DMA unit, the first data stored in the buffer memory from the buffer memory to the host device, in parallel with transmitting the second data from the nonvolatile memory device to the buffer memory; and
    completing, by the memory control unit, a read control operation for reading out the second data, in parallel with transmitting the first data stored in the buffer memory from the buffer memory to the host device.

11. The method according to claim 10, further comprising:
    providing, by the memory control unit, a first task including information necessary for transmitting the first data, to the first DMA block, after a read control operation for reading out the first data is completed.

12. The method according to claim 11, wherein the transmitting by the DMA unit comprises:
    transmitting, by the first DMA block, the first data read out from the nonvolatile memory device, to the buffer memory, according to the first task.

13. The method according to claim 12, wherein the transmitting by the DMA unit comprises:
    transferring, by the first DMA block, the first task to the second DMA block after transmitting the first data from the nonvolatile memory device to the buffer memory.

14. The method according to claim 13, wherein the transmitting by the DMA unit comprises:
    transmitting, by the second DMA block, the first data stored in the buffer memory to the host device according to the first task.

15. The method according to claim 10, further comprising:
    providing, by the memory control unit, a second task including information necessary for transmitting the second data, to the first DMA block.

16. The method according to claim 15, wherein the transmitting by the DMA unit comprises:
    transmitting, by the second DMA block, the second data read out from the nonvolatile memory device, to the buffer memory, according to the second task.

17. The method according to claim 16, wherein the transmitting by the DMA unit comprises:
    transferring, by the first DMA block, the second task to the second DMA block after transmitting the second data from the nonvolatile memory device to the buffer memory.

18. The method according to claim 17, wherein the transmitting by the DMA unit comprises:
    transmitting, by the second DMA block, the second data from the buffer memory to the host device according to the second task.

* * * * *